United States Patent
Wrbanek et al.

(10) Patent No.: US 10,429,521 B1
(45) Date of Patent: Oct. 1, 2019

(54) LOW POWER CHARGED PARTICLE COUNTER

(71) Applicant: The United States of America, as represented by the Administrator of the National Aeronautics and Space Administration, Washington, DC (US)

(72) Inventors: Susan Y. Wrbanek, Sheffield Village, OH (US); John D. Wrbanek, Sheffield Village, OH (US); Gustave C. Fralick, Middleburg Heights, OH (US)

(73) Assignee: United States of America as Represented by the Administrator of National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 14/600,090

(22) Filed: Jan. 20, 2015

Related U.S. Application Data (60) Provisional application No. 61/931,189, filed on Jan. 24, 2014.

(51) Int. Cl.
| | |
|---|---|
| *G01T 1/24* | (2006.01) |
| *G01T 1/20* | (2006.01) |
| *G01T 1/203* | (2006.01) |
| *G01T 1/202* | (2006.01) |
| *G01T 1/204* | (2006.01) |
| *G01T 1/208* | (2006.01) |

(52) U.S. Cl.
CPC ............ *G01T 1/2018* (2013.01); *G01T 1/208* (2013.01); *G01T 1/2023* (2013.01); *G01T 1/2033* (2013.01); *G01T 1/2042* (2013.01)

(58) Field of Classification Search
CPC ..... G01T 1/2002; G01T 1/202; G01T 1/2018; G01T 1/20; G01T 1/1642
See application file for complete search history.

(56) References Cited

U.S. PATENT DOCUMENTS

| | | | |
|---|---|---|---|
| 3,717,767 | A | 2/1973 | Gold et al. |
| 6,011,265 | A | 1/2000 | Sauli |
| 6,362,479 | B1 | 3/2002 | Andreaco et al. |
| 7,053,375 | B2 | 5/2006 | Ando et al. |
| 7,635,849 | B2 | 12/2009 | Klein et al. |
| 7,659,519 | B1 | 2/2010 | Zheng et al. |
| 7,897,938 | B2 | 3/2011 | Homme et al. |
| 7,973,272 | B2 | 7/2011 | DeFlumere et al. |

(Continued)

OTHER PUBLICATIONS

Camp ("Using a two-scintillator paddle telescope for cosmic ray flux measurements" Dec. 20, 2012 Department of Physics and Astronomy, Georgia State University, pp. 1-43, www.gsu.edu).*

(Continued)

*Primary Examiner* — David P Porta
*Assistant Examiner* — Mamadou Faye
(74) *Attorney, Agent, or Firm* — Robert H. Earp, III; William M. Johnson (57) ABSTRACT

A small, low power, solid state particle counter may be configured to detect radiation. A scintillator may be doped to emit light in a predetermined energy range when impacted by radiation particles. A photodiode attached to or held against the scintillator may be configured to detect the emitted light in the predetermined energy range and output a current proportional to an amount of the emitted light.

20 Claims, 7 Drawing Sheets

(56) References Cited

U.S. PATENT DOCUMENTS

| | | | |
|---|---|---|---|
| 8,039,792 | B2 | 10/2011 | Nikitin et al. |
| 8,158,953 | B1 | 4/2012 | Friedman |
| 8,426,823 | B2 | 4/2013 | Schulz et al. |
| 8,476,599 | B2 | 7/2013 | Perna |
| 8,658,978 | B2 | 2/2014 | Blackburn et al. |
| 9,224,901 | B1* | 12/2015 | Squillante ............... G21H 1/12 |
| 2003/0021376 | A1* | 1/2003 | Smith ......................... 378/98.8 |
| 2004/0114716 | A1* | 6/2004 | Cole ................... G01N 23/223 378/57 |
| 2006/0054863 | A1* | 3/2006 | Dai et al. ............... 252/301.4 R |
| 2007/0007460 | A1 | 1/2007 | Hochstetler et al. |
| 2007/0096031 | A1 | 5/2007 | Meier et al. |
| 2008/0021256 | A1* | 1/2008 | Srinivas et al. ................. 600/3 |
| 2008/0191134 | A1 | 8/2008 | Almogy et al. |
| 2009/0208398 | A1* | 8/2009 | Li et al. ........................ 423/263 |
| 2009/0261262 | A1 | 10/2009 | Hunt |
| 2010/0171039 | A1* | 7/2010 | Wilson .......................... 250/368 |
| 2010/0223010 | A1* | 9/2010 | Nikitin et al. ..................... 702/8 |
| 2010/0270471 | A1* | 10/2010 | Marrs et al. ............. 250/370.11 |
| 2011/0192981 | A1* | 8/2011 | Menge ................... G01T 1/203 250/362 |
| 2012/0181439 | A1* | 7/2012 | Cao ....................... G01T 1/2018 250/366 |
| 2013/0075718 | A1* | 3/2013 | Nause ....................... G01T 3/06 257/43 |
| 2013/0168796 | A1 | 7/2013 | Ikhlef et al. |
| 2013/0284884 | A1 | 10/2013 | Friedman |
| 2014/0264057 | A1* | 9/2014 | Cress ....................... G01T 3/06 250/390.11 |
| 2018/0155620 | A1* | 6/2018 | Stand ................... G01T 1/2018 |

OTHER PUBLICATIONS

Jordan et al. ("Progress Report on the Advanced Large-Area Plastic Scintillators (ALPS)" May 2003, p. 1.1-5.1, U.S. Department of Energy).*

* cited by examiner

LOW POWER CHARGED PARTICLE COUNTER

CROSS REFERENCE TO RELATED APPLICATION

This application is a non-provisional of, and claims priority to, U.S. Provisional Patent Application Ser. No. 61/931,189 filed Jan. 24, 2014. The subject matter of this earlier-filed application is hereby incorporated by reference in its entirety.

ORIGIN OF THE INVENTION

The invention described herein was made by employees of the United States Government and may be manufactured and used by or for the Government for Government purposes without the payment of any royalties thereon or therefore.

FIELD

The present invention generally pertains to particle detection, and more specifically, to a low power charged particle counter.

BACKGROUND

High energy charged particles may be detected when these particles strike a suitable scintillator material, such as certain plastics. The scintillator material emits photons that are typically at an ultraviolet (UV) wavelength when struck. Conventional paddle style scintillation radiation detectors include relatively large (i.e., 0.5 to 6 foot) plastic scintillators attached to photomultiplier tubes (PMTs) or silicon-based photodiodes. A "waveshifter" material with a dopant that re-emits the scintillator light at a wavelength that matches the sensitivity of the PMT or photodiode is added, which introduces dead space in the counter.

PMTs are delicate, high voltage vacuum tube detectors that generate a cascade of electrons when they receive incident light. Most conventional PMTs are at least eight inches long and exceed three inches in diameter. Such large, heavy parts that require high voltage do not lend themselves to space applications, for example. Furthermore, vacuum tube sensor operation becomes problematic outside of the standard temperature and pressure (STP) environment found on the surface of the Earth. This also makes these particle counters a poor fit for undersea and subterranean applications, such as deep sea exploration and drilling. Also, silicon photodiodes are extremely sensitive to temperature changes for operation with scintillators and require temperature stability. This does not work well in space, at high altitude, or in terrestrial environments where temperature varies significantly. Accordingly, an improved particle counter may be beneficial.

SUMMARY

Certain embodiments of the present invention may be implemented and provide solutions to the problems and needs in the art that have not yet been fully solved by conventional particle counter technologies. For example, some embodiments of the present invention pertain to a small, low power, solid state particle counter that can be used for particle detection in various systems and environments that are not possible with conventional particle counters.

In one embodiment, an apparatus includes a scintillator doped to emit light in a predetermined energy range when impacted by radiation particles. The apparatus also include a photodiode configured to detect the emitted light in the predetermined energy range and output a current proportional to an amount of the emitted light. The photodiode is attached to or held against the scintillator.

In another embodiment, an apparatus includes a polyvinyltoluene paddle scintillator doped to emit light in an energy range between blue and ultraviolet when impacted by radiation particles. The apparatus also includes a gallium phosphide photodiode attached to or held against a beveled end of the scintillator on a side of the photodiode having a window. The photodiode is configured to receive the emitted light through the window and output a current proportional to an amount of the emitted light.

In yet another embodiment, a system includes a solid state scintillator doped to emit light in a predetermined energy range when impacted by radiation particles and a solid state photodiode attached to or held against the scintillator. The photodiode is configured to detect the emitted light in the predetermined energy range and output a current proportional to an amount of the emitted light. The system also includes a preamplifier configured to receive the current outputted from the photodiode as pulses, amplify voltages of the pulses proportional to a total integrated charge of each pulse, and output the amplified pulses. The system further includes a computing system configured to receive the amplified pulses from the preamplifier and record pulse counts in memory.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments of the present invention pertain to a small, low power, solid state particle counter configured to detect radiation. The lack of a required high voltage power supply or temperature regulation due to the low dark current of the detector in some embodiments requires less power per active area to operate than a conventional PMT array or avalanche photodiode (APD) array for similar performance. For instance, particle counters with GaP photodiodes in some embodiments require up to 750 times less power to operate per active area than conventional arrays.

The particle counters of some embodiments function by detecting photon emissions that occur when radiation particles strike paddle material. These detectors may be useful for trigger and veto (i.e., rejection) roles in data acquisition. In certain embodiments, the particle counters may be designed to conform to the internal or external geometry of a larger system. These particle counters may be designed to round corners, fill odd geometries, and/or to fit in a compact volume.

The particle counters of some embodiments may be used for various applications and systems including, but not limited to, flexible path satellites, cubesats, planetary landers and rovers, low Earth orbit (LEO) vehicles, deep space vehicles, aircraft-based platforms, submersibles, drilling rigs, medical imaging devices (as start and stop triggers), and detectors of radiological material for security purposes. When radiation above a certain threshold is detected, sensitive systems may be shut down and protected. For manned craft or other situations where humans may come into contact with radiation, these individuals may be warned and protected. Also, since radiation from space may have an impact on planetary surfaces and weather, cloud formation, climate, and magnetosphere shaping, depending on the radiation environment and planetary characteristics, this radiation may be detected to further understanding of these effects.

Figure 1:
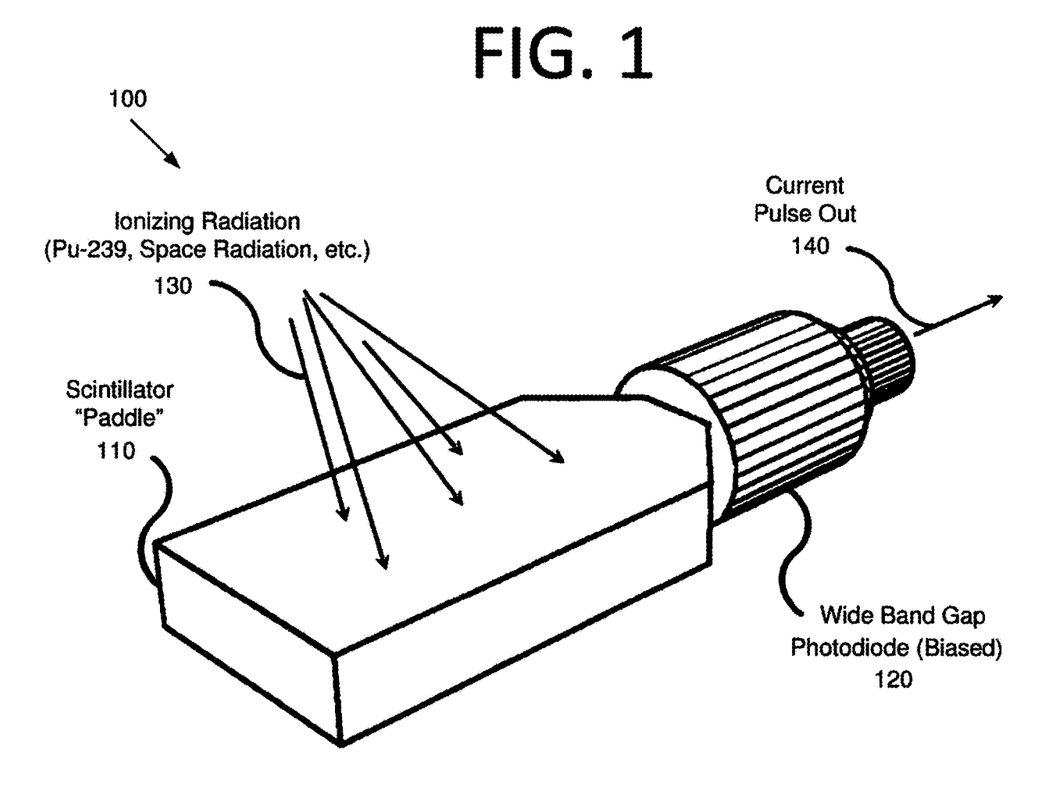
FIG. 1 is a perspective view of a low power charged particle counter, according to an embodiment of the present invention.

FIG. 1 is a perspective view of a low power charged particle counter 100, according to an embodiment of the present invention. Particle counter 100 includes a scintillator paddle 110 and a wide band gap photodiode 120. However, in some embodiments, any number of paddles and/or photodiodes may be used. Photodiode 120 may be attached to or held against scintillator paddle 110 using glue, tape, fasteners, clamps, or any other suitable mechanism as a matter of design choice. In this embodiment, scintillator paddle 110 is beveled on an end that is attached to or held against a window of photodiode 120 and reflects light toward photodiode 120.

Scintillator paddle 110 may be any material that emits photons at certain wavelengths when impacted by high energy charged particles. For instance, scintillator paddle 110 may be constructed from iodide crystal, acrylic ribbon, polyvinyltoluene, or any other suitable plastic or material in some embodiments. Plastic scintillators may be polyvinyltoluene, polystyrene, or acrylics containing anthracene or stilbene crystals in some embodiments. These scintillators emit near-UV light when exposed to ionizing radiation from ions, electrons, photons, or neutrons.

The paddle material may be selected for its reaction to certain types of radiation. For instance, doping a plastic scintillator with lead or tin provides increased sensitivity to gamma rays and x-rays, whereas doping with boron, lithium, or gadolinium provides increased sensitivity to neutrons. In this manner, the scintillator paddle can be tailored to the type of radiation that is more pertinent to the particular application.

Photodiode 120 may be a gallium phosphide (GaP) photodiode or may be constructed from any suitable material. Photodiode 120 may be connected to or otherwise operably interface with a commercial off-the-shelf (COTS) preamplifier or any suitable custom preamplifier (not shown). In this embodiment, particle counter 100 is 2 inches long and ¾ inch wide. However, the size of the particle counter may vary as a matter of design choice.

When ionizing radiation 130, such as alpha radiation from plutonium-239 ($^{239}$Pu) or space radiation (e.g., gamma rays, cosmic rays, etc.) strikes scintillator paddle 239, light is emitted. When photodiode 120 receives this light, a current pulse out 140 is generated. This current may then be amplified by a charge-sensitive preamplifier (not shown) to provide a voltage proportional to the total integrated charge of each pulse from the photodiode. This voltage may then be interpreted by conventional electronics, such as a computer, an integrated circuit, a field programmable gate array (FPGA), or any other suitable computing system, in order to record "counts."

Figure 2A:
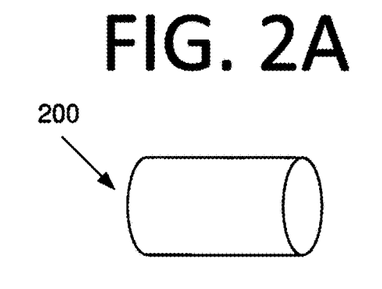
FIG. 2A illustrates a cylinder-shaped scintillator paddle, according to an embodiment of the present invention.
Figure 2B:
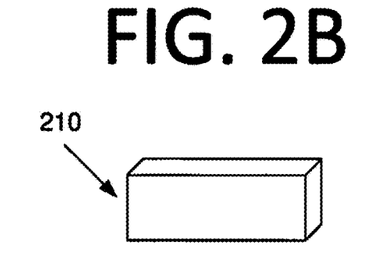
FIG. 2B illustrates a box-shaped scintillator paddle, according to an embodiment of the present invention.
Figure 2C:
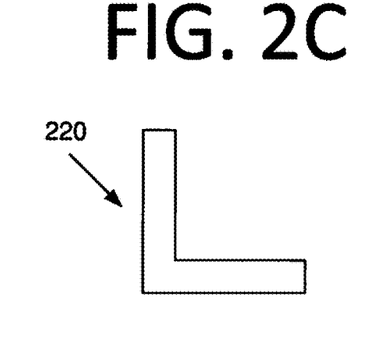
FIG. 2C illustrates a right angle scintillator paddle, according to an embodiment of the present invention.

As discussed above, the particle counters of some embodiments may be designed to conform to the internal or external geometry of a larger system by rounding corners, filling odd geometries, and/or to fitting in a compact volume. FIGS. 2A-C illustrate scintillator paddles 200, 210, 220, each having different shapes to fulfill different mission requirements. Paddle 200 is cylinder-shaped, paddle 210 is box-shaped, and paddle 220 is bent at a right angle. The paddle shapes shown in FIGS. 2A-C are by way of example only, and any suitable geometric, bent, curved, screw, and/or irregular shapes may be used as a matter of design choice in some embodiments. The scintillator may also be of any desired size. Organic crystals, liquid organic solutions, plastic scintillators, thin film scintillators, and/or loaded scintillators may be used in some embodiments.

Figure 3:
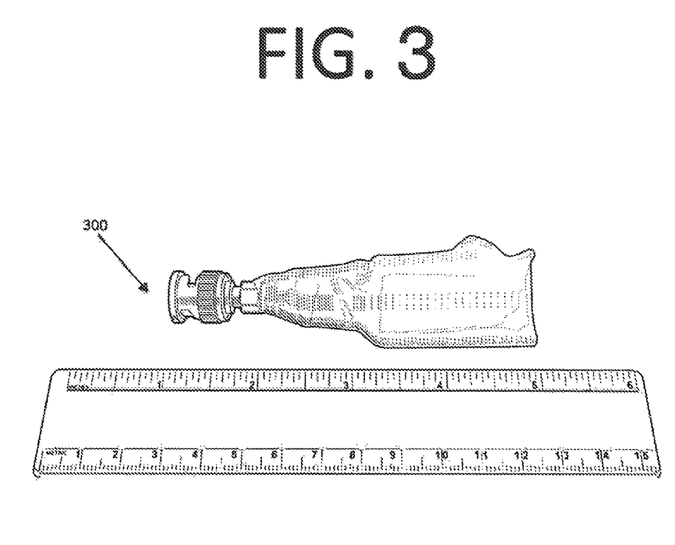
FIG. 3 is a photograph illustrating a miniature scintillation/diode ionizing radiation detector, according to an embodiment of the present invention.
Figure 4:
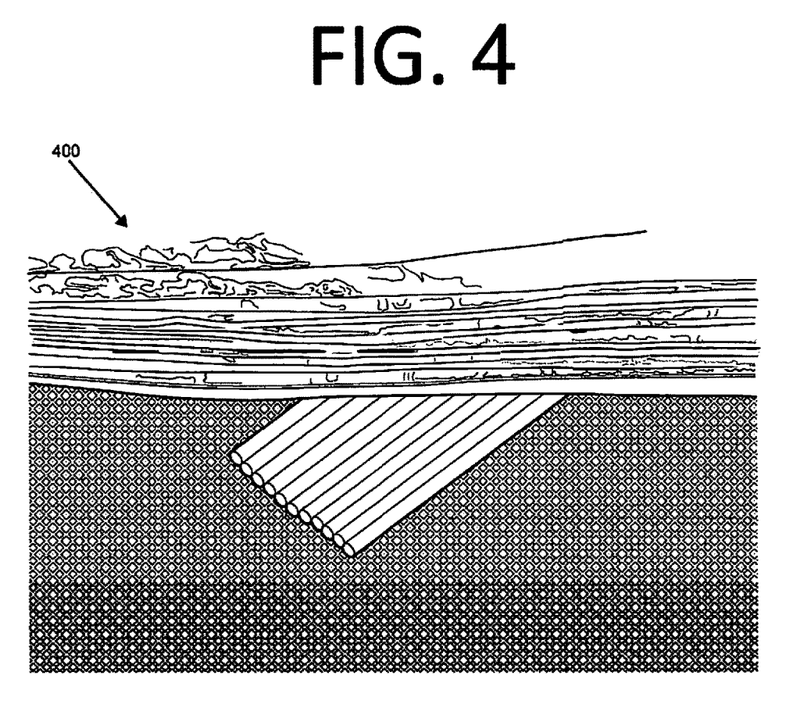
FIG. 4 is a photograph illustrating an acrylic ribbon scintillator, according to an embodiment of the present invention.

FIG. 3 is a photograph 300 illustrating a prototype miniature scintillation/diode ionizing radiation detector (i.e., particle counter), according to an embodiment of the present invention. In commercial embodiments, further miniaturization and refinement may occur. A ruler is provided for scale. Alternatively, rather than a paddle, the scintillator may be an acrylic ribbon scintillator, such as scintillator 400 shown in FIG. 4.

In the prototype detector of FIG. 3, a polyvinyltoluene scintillator was doped to emit weak blue-UV flashes of light when radiation (e.g., alpha, beta, cosmic ray, muon, proton, lower energy x-rays, etc.) is incident on the plastic. The scintillator was polished to be smooth. Ionizing radiation causes absorption of energy by the scintillator material, which causes electrons in molecules including the material to temporarily take on a higher energy state. This higher energy state quickly decays to a partially stable energy state above the ground state, but lower than the high energy state to which the electrons were initially excited. From there, the electron decays to the ground state within a material-specific time, releasing prompt fluorescence (i.e., light) in the process.

The emitted light is collected by a GaP photodiode with a bias on the photodiode. Approximately ½ inch of one end of the scintillator was beveled to approximately a 1/16 inch square to fit next to the window of the photodiode and to reflect light toward the photodiode. The scintillator is mated to the photodiode using an optical interface pad cut to fit over the GaP photodiode and surrounded by silicone optical grease. For purposes of this prototype, the scintillator paddle was wrapped around the edges with Teflon™ tape and held to the case of the photodiode with Kapton™ tape.

For high energy applications, the scintillator may be covered with Teflon™, Tyvek™, aluminum, or any other suitable reflective material. The covering may be metallic or dielectric, depending on the application and need. Different solid state photodetectors and/or photodiodes may be used in some embodiments. However, these photodetectors and/or photodiodes should be fast, with a reaction time of one nanosecond or less, and sensitive to the blue to UV light emitted by the scintillator.

When energetic ions strike the scintillator, faint, weak pulses of light are emitted that may be detected by fast, efficient photodetectors (here, a GaP photodiode). The photodiode generates current proportional to the amount of light incident upon it. In this prototype embodiment, the photodiode was connected to a COTS charge-sensitive preamplifier that gives a voltage output proportional to the total integrated charge of the pulse from the photodiode. A current pulse detector was used to read the current pulses from the photodiode, and these pulses were then recorded by a computing system.

Figure 5:
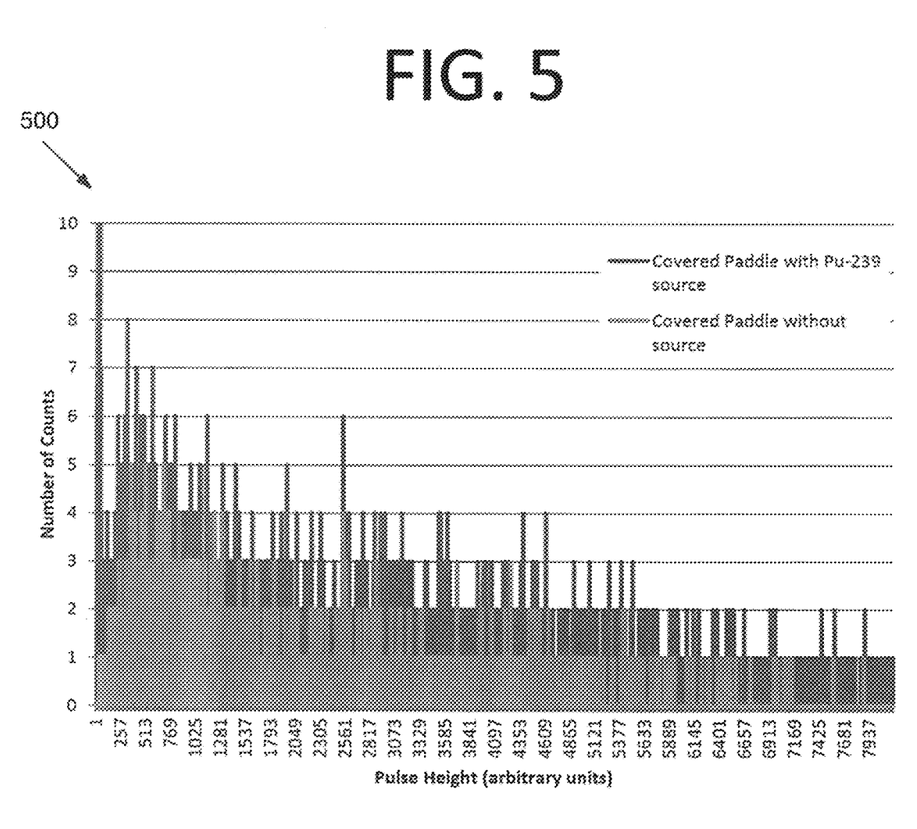
FIG. 5 is a graph illustrating the number of counts versus pulse height, according to an embodiment of the present invention.

In an experiment, the detector of FIG. 3 was tested for response to a $^{239}$Pu alpha source. The detector was allowed to react for approximately ten minutes without the alpha source and then for another ten minutes with the alpha source. The photodiode was connected to a COTS charge-sensitive preamplifier which gives a voltage output proportional to the total integrated charge of the pulse from the photodiode. A current pulse detector read current pulses from the photodiode which were recorded by computing system. Though the test environment was not optimized, and the detector was not optimized for size and noise insulation, a two to threefold increase in signal, depending on energy, was realized when the alpha source was placed approximately ¼ inch from the scintillator. These results are shown as the number of counts versus pulse height in arbitrary units in graph 500 of FIG. 5.

Figure 6:
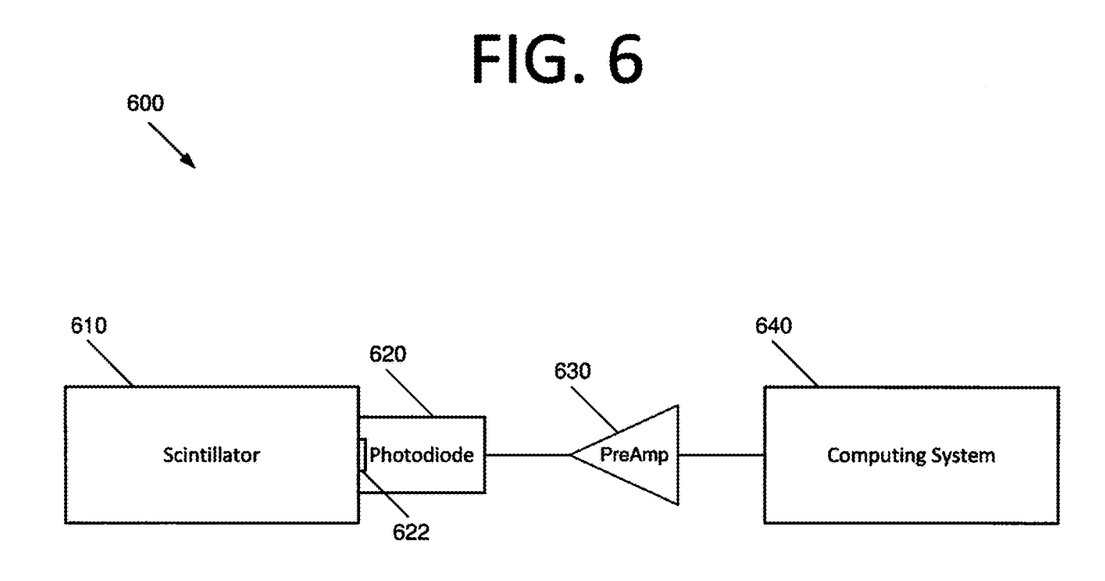
FIG. 6 is an architectural diagram illustrating a particle counter system, according to an embodiment of the present invention.

FIG. 6 is an architectural diagram illustrating a particle counter system 600, according to an embodiment of the present invention. A scintillator 610 is doped to emit light in a predetermined energy range (e.g., blue to UV) when impacted by radiation. A photodiode 620 having a window 622 is connected to or held against scintillator 610 and configured to detect light in the predetermined range. When photodiode 620 receives the light, photodiode 620 generates a pulse current that is received by a charge-sensitive preamplifier 630. Preamplifier 630 amplifies the pulse current to give a voltage proportional to the total integrated charge of each pulse from photodiode 620. A computing system 640 then receives the amplified pulse current from preamplifier 630 and records the pulse counts for a desired purpose, such as providing radiation information, determining whether sensitive systems should shut down to protect themselves, warning humans that may experience the radiation, etc.

Figure 7:
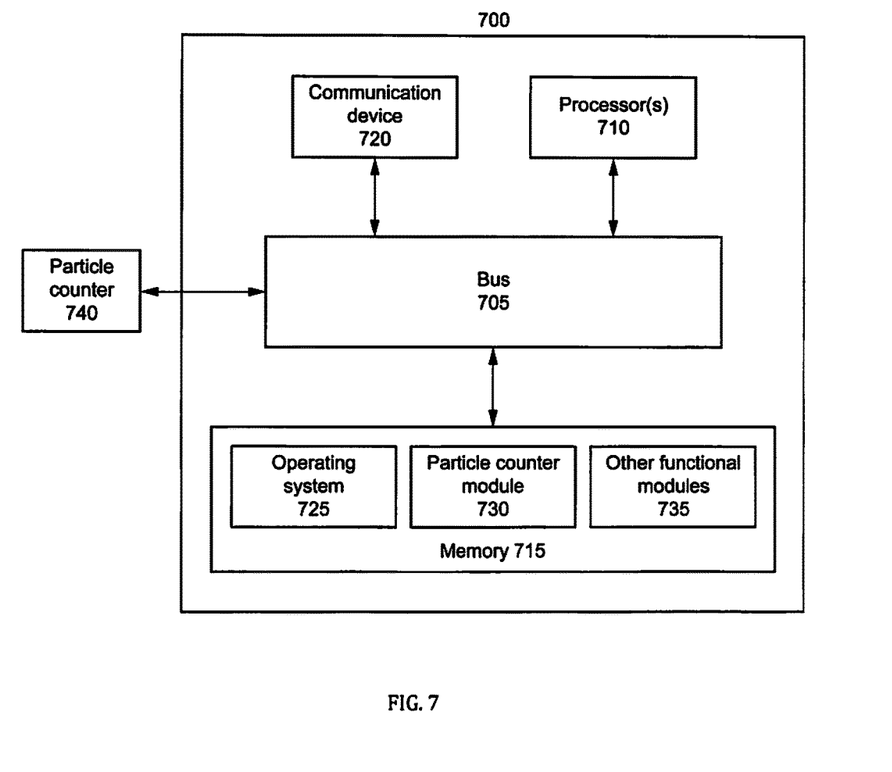
FIG. 7 is a block diagram illustrating a computing system configured to count pulses, according to an embodiment of the present invention.

FIG. 7 is a block diagram illustrating a computing system 700 configured to count pulses, according to an embodiment of the present invention. System 700 includes a bus 705 or other communication mechanism for communicating information, and processor(s) 710 coupled to bus 705 for processing information. Processor(s) 710 may be any type of general or specific purpose processor, including a central processing unit (CPU) or application specific integrated circuit (ASIC). System 700 further includes a memory 715 for storing information and instructions to be executed by processor(s) 710. Memory 715 can be comprised of any combination of random access memory ("RAM"), read only memory ("ROM"), flash memory, cache, static storage such as a magnetic or optical disk, or any other types of non-transitory computer-readable media or combinations thereof. Additionally, system 700 includes a communication device 720, such as a transceiver, to facilitate wired or wireless communication with external systems.

Non-transitory computer-readable media may be any available media that can be accessed by processor(s) 710 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Memory 715 stores software modules that provide functionality when executed by processor(s) 710. The modules include an operating system 725 for system 700. The modules further include a particle counter module 730 that is configured to detect radiation counts from pulses supplied by a particle counter 740. System 700 may include one or more additional functional modules 735 that include additional functionality.

One skilled in the art will appreciate that a "system" could be embodied as a computer, a server, an embedded chip, a console, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
a charged particle detecting plastic scintillator doped to emit light in a predetermined energy range and configured to emit said light when impacted by charged particles originating from a source external to the apparatus; and
a wide-bandgap photodiode configured to detect the emitted light in the predetermined energy range and output a current proportional to an amount of the emitted light, wherein:
the wide-bandgap photodiode, without a waveshifting element, is connected to the scintillator at a surface of the wide-bandgap photodiode to form a continuous body; and
at the surface of the wide-bandgap photodiode, the wide-bandgap photodiode has a dimension that is smaller than that of the plastic scintillator.

2. The apparatus of claim 1, further comprising:
a preamplifier configured to receive the current outputted from the wide-bandgap photodiode as pulses, amplify voltages of the pulses proportional to a total integrated charge of each pulse, and output the amplified pulses.

3. The apparatus of claim 2, further comprising:
a computing system configured to receive the amplified pulses from the preamplifier and record pulse counts in memory.

4. The apparatus of claim 1, wherein the plastic scintillator is a paddle scintillator.

5. The apparatus of claim 4, wherein the paddle scintillator is beveled at one end to connect to a window of the wide-bandgap photodiode.

6. The apparatus of claim 1, wherein the apparatus is configured to conform to an internal or external geometry of a larger system.

7. The apparatus of claim 5, wherein the plastic scintillator comprises suitable geometric, bent, curved, screw, and/or irregular shapes to conform to the internal or external geometry of the larger system.

8. The apparatus of claim 1, wherein plastic scintillator comprises acrylic ribbon.

9. The apparatus of claim 1, wherein a material of the plastic scintillator responds to a desired type of radiation.

10. The apparatus of claim 1, wherein the predetermined range comprises blue to ultraviolet light.

11. The apparatus of claim 1, wherein the wide-bandgap photodiode comprises a gallium phosphide photodiode.

12. The apparatus of claim 1, wherein the plastic scintillator is polished until smooth.

13. The apparatus of claim 1, wherein the plastic scintillator is covered in a metallic or dielectric reflective material.

14. An apparatus, comprising:
a charged particle detecting polyvinyltoluene paddle scintillator configured to emit light when impacted by charged particles originating from a source external to the apparatus, wherein the charged particle detecting polyvinyltoluene paddle scintillator is doped to emit said light in an energy range between blue and ultraviolet when impacted by the charged particles; and
a gallium phosphide photodiode that directly contacts a beveled end of the scintillator on a side of the photodiode having a window, wherein the photodiode directly contacts the beveled end without a waveshifting element being between the photodiode and the beveled end, wherein the photodiode is configured to receive the emitted light through the window and output a current proportional to an amount of the emitted light.

15. The apparatus of claim 14, wherein the scintillator comprises suitable geometric, bent, curved, screw, and/or irregular shapes to conform to an internal or external geometry of a larger system.

16. The apparatus of claim 14, wherein the scintillator is polished until smooth.

17. A system, comprising:
- a charged particle detecting plastic scintillator doped to emit light in a predetermined energy range and configured to emit said light when impacted by charged particles originating from a source external to the system;
- a solid state wide-bandgap photodiode that is connected to a surface of the plastic scintillator to form a continuous body, without a waveshifting element being between the wide bandgap photodiode and the plastic scintillator, wherein the wide-bandgap photodiode is configured to detect the emitted light in the predetermined energy range and output a current proportional to an amount of the emitted light;
- a preamplifier configured to receive the current outputted from the wide-bandgap photodiode as pulses, amplify voltages of the pulses proportional to a total integrated charge of each pulse, and output the amplified pulses; and
- a computing system configured to receive the amplified pulses from the preamplifier and record pulse counts in memory, wherein a surface of the wide-bandgap photodiode has a dimension that is smaller than that of the surface of the plastic scintillator.

18. The system of claim 17, wherein the plastic scintillator comprises suitable geometric, bent, curved, screw, and/or irregular shapes to conform to an internal or external geometry of a larger system.

19. The apparatus of claim 1, wherein an overall length of the continuous body is under 5 inches.

20. The system of claim 17, wherein an overall length of the continuous body is under 5 inches.

* * * * *